(12) United States Patent
Medley et al.

(10) Patent No.: US 7,686,051 B2
(45) Date of Patent: Mar. 30, 2010

(54) CENTRAL TIRE INFLATION WHEEL ASSEMBLY AND VALVE

(76) Inventors: Martin A. Medley, 7645 Tralee Way, Bradenton, FL (US) 34202; Douglas P. Miller, 12740 Scarborough Dr., New Berlin, WI (US) 53151; Donald E. Blackman, 9012 W. 175$^{th}$ St., Tinley Park, IL (US) 60487

( * ) Notice: Subject to any disclaimer, the term of this patent is extended or adjusted under 35 U.S.C. 154(b) by 327 days.

(21) Appl. No.: 11/680,303

(22) Filed: Feb. 28, 2007

(65) Prior Publication Data
US 2007/0204946 A1 Sep. 6, 2007

Related U.S. Application Data

(60) Provisional application No. 60/778,040, filed on Mar. 1, 2006.

(51) Int. Cl.
*B60C 29/02* (2006.01)
*F16K 15/20* (2006.01)

(52) U.S. Cl. ............... 152/428; 152/415; 137/224; 137/494

(58) Field of Classification Search ......... 152/415–418, 152/427–429; 137/224, 494, 496
See application file for complete search history.

(56) References Cited

U.S. PATENT DOCUMENTS

| 3,635,275 | A | * | 1/1972 | Davis et al. ............ | 152/429 |
|---|---|---|---|---|---|
| 3,910,223 | A | * | 10/1975 | Krohn ................ | 116/70 |
| 3,910,233 | A | * | 10/1975 | Amburn .............. | 119/6.8 |
| 3,911,988 | A | * | 10/1975 | Richards ............. | 152/427 |
| 4,015,819 | A | * | 4/1977 | Zahid ................ | 251/339 |
| 4,106,543 | A | * | 8/1978 | Sano ................. | 152/405 |
| 4,653,527 | A | * | 3/1987 | Kosarzecki ........... | 137/244 |
| 4,765,385 | A | * | 8/1988 | McGeachy ............ | 152/416 |
| 4,895,199 | A | * | 1/1990 | Magnuson et al. ....... | 152/415 |
| 5,181,977 | A | * | 1/1993 | Gneiding et al. ........ | 152/429 |
| 5,778,923 | A | * | 7/1998 | Marston ............. | 137/226 |
| 6,374,852 | B1 | * | 4/2002 | Olivas ............... | 137/493.9 |
| 6,474,383 | B1 | | 11/2002 | Howald et al. | |

(Continued)

OTHER PUBLICATIONS

*Central Tire Inflation Systems*, PowerPoint presentation by Hutchinson Industries, Inc. Wheel Division, Trenton, NJ, Oct. 10, 2001, 12 pages.

(Continued)

*Primary Examiner*—Russell D Stormer
(74) *Attorney, Agent, or Firm*—Boyle Fredrickson, S.C.

(57) ABSTRACT

The present invention is a wheel assembly having a rim with a valve aperture extending therethrough that is designed to receive a valve having a simplified a construction that can be seated directly within a tire wheel assembly to minimize the number and type of components necessary for the valve. The valve includes a main body that is positionable in a sealed and recessed or embedded configuration within the aperture in the wheel rim in communication with the interior of the tire and with a pressurized air source that is used to inflate or deflate the tire. The main body encloses a valve mechanism that includes a components situated within the main body in a manner that enables the parts to be easily removed, cleaned and/or replaced if necessary without having to remove the entire valve assembly from the wheel.

17 Claims, 11 Drawing Sheets

U.S. PATENT DOCUMENTS

| | | |
|---|---|---|
| 7,168,468 B2 | 1/2007 | Wang et al. |
| 7,363,938 B1 * | 4/2008 | Newton ................ 137/494 |
| 2006/0266420 A1 * | 11/2006 | Lonnes ................ 137/496 |

OTHER PUBLICATIONS

Drawing No. WA-0394, Hutchinson Industries Inc. Wheel Division, Trenton, NJ, Dec. 9, 2004, 2 pages.

Drawing No. WI-0394, Hutchinson Industries Inc. Wheel Division, Trenton, NJ, Jan. 3, 2003, 3 pages.

Drawing No. WA-0425, Hutchinson Industries Inc. Wheel Division, Trenton, NJ, Jul. 25, 2003, 1 page.

Drawing No. WA-0506, Hutchinson Industries Inc. Wheel Division, Trenton, NJ, Sep. 22, 2004, 2 pages.

\* cited by examiner

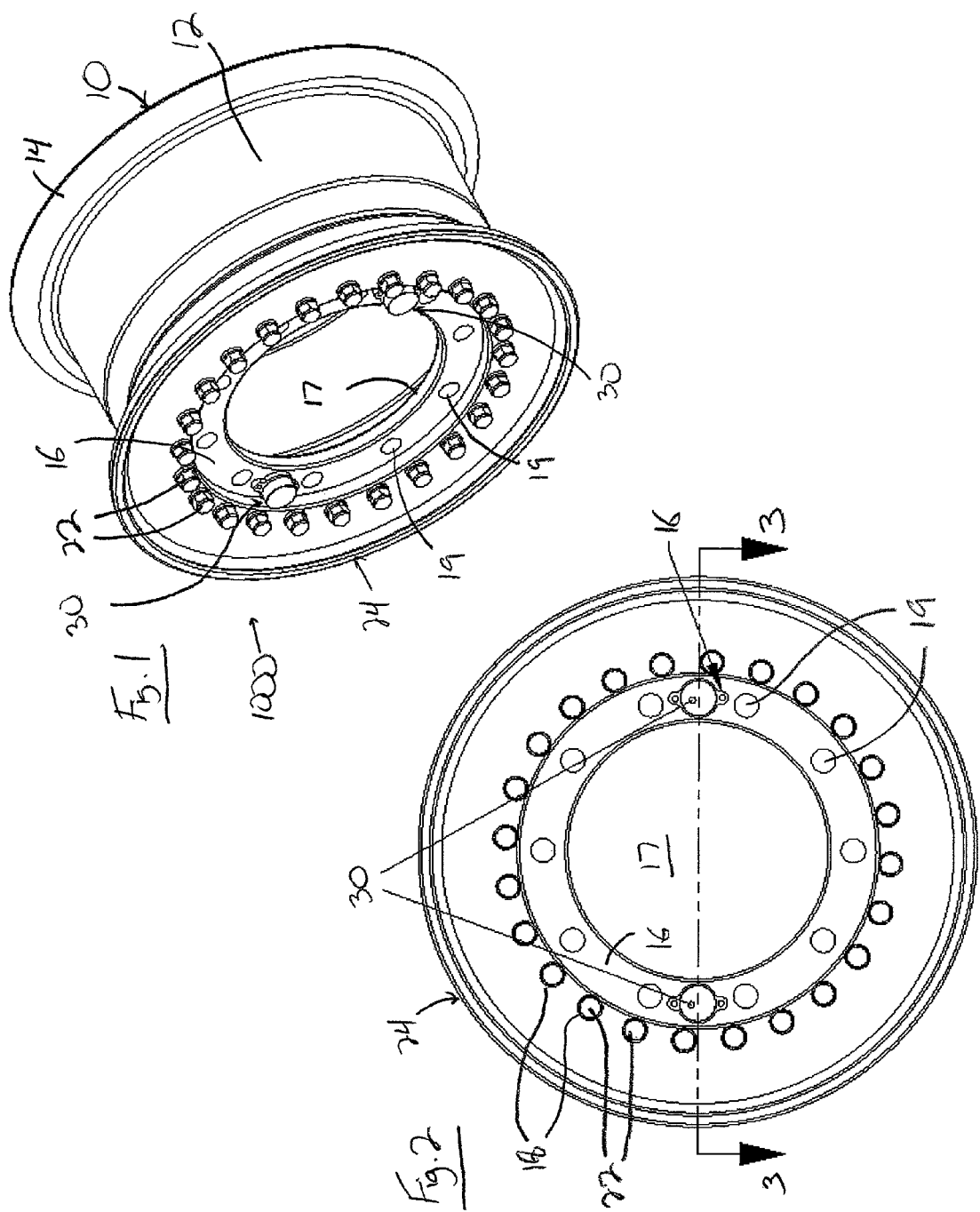

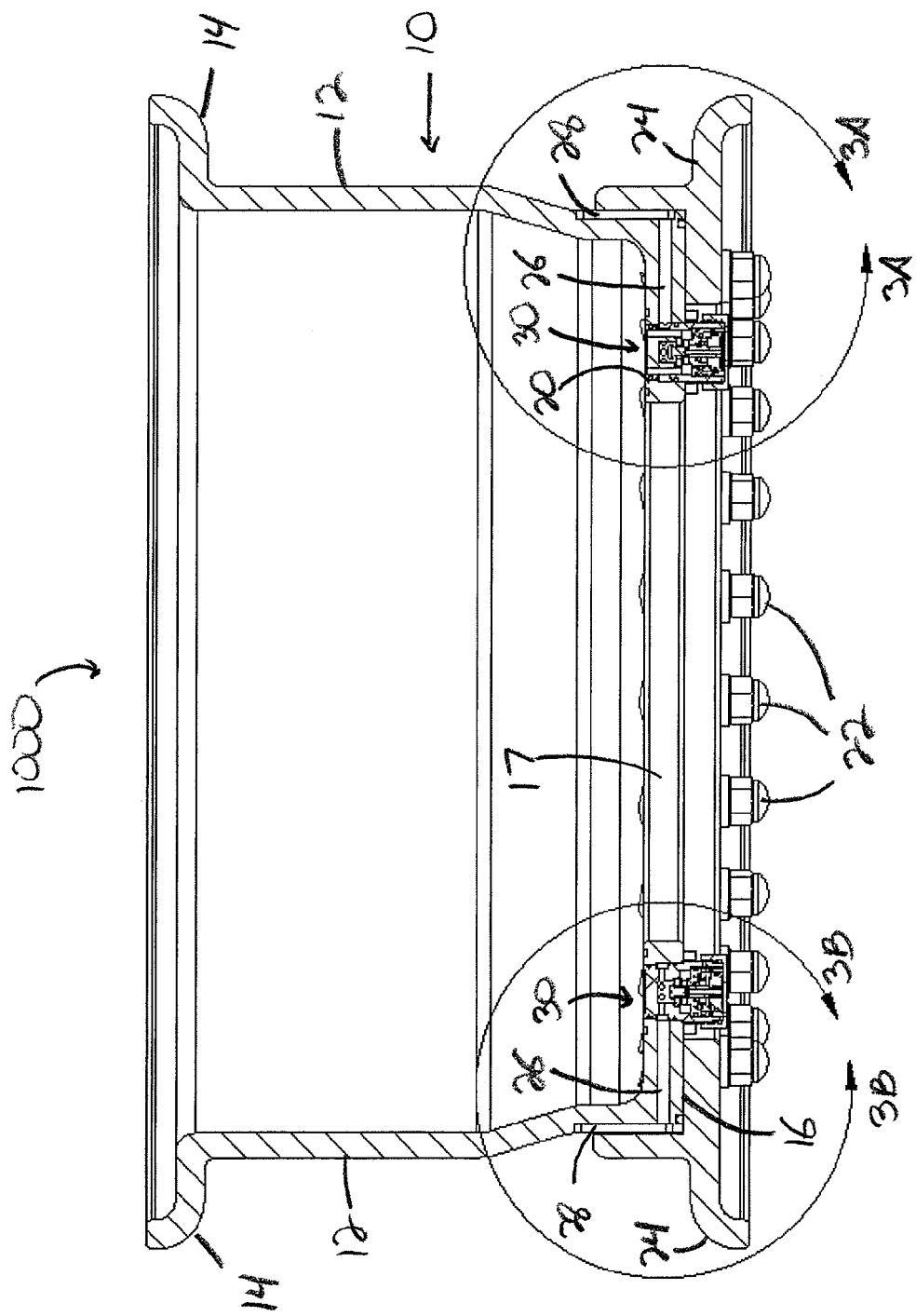

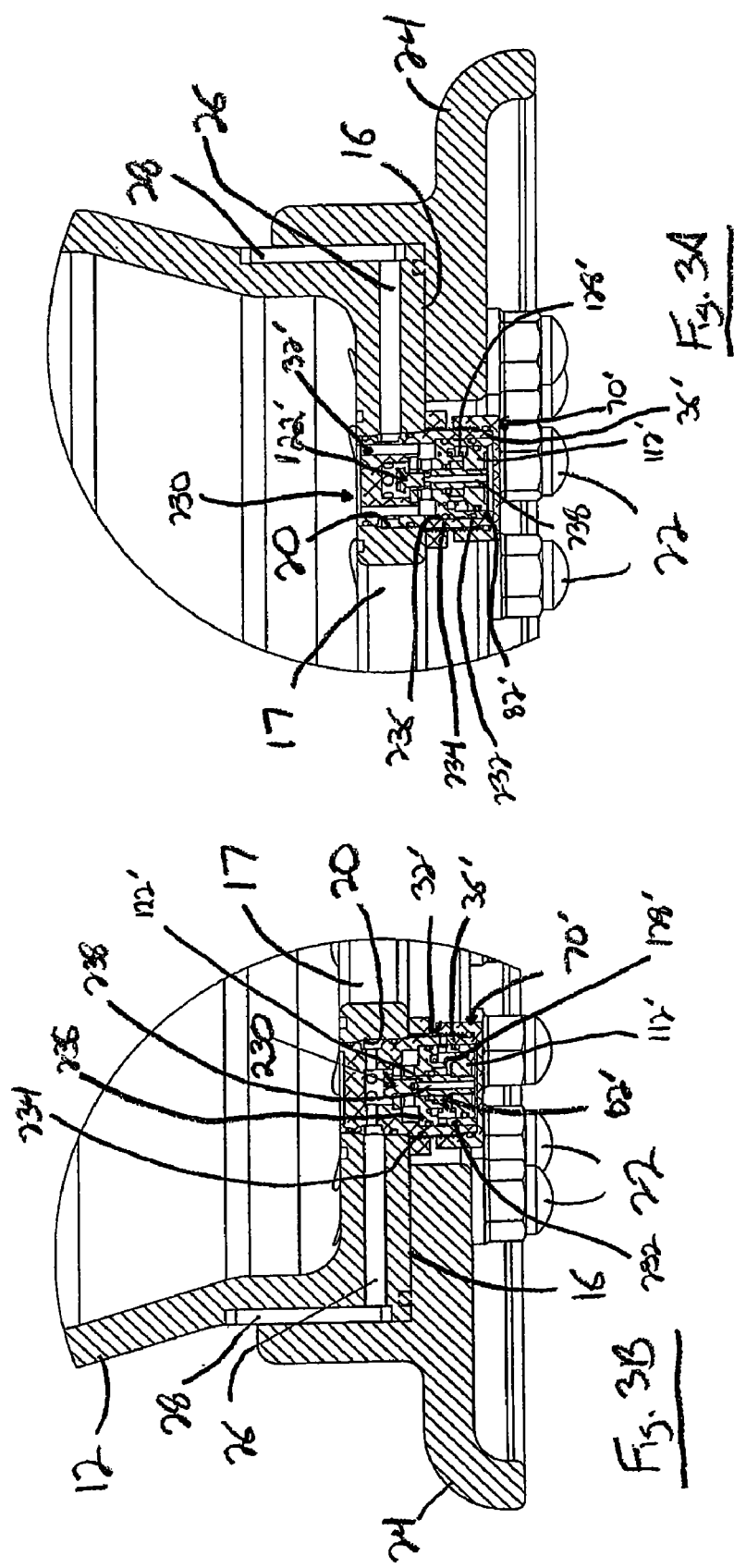

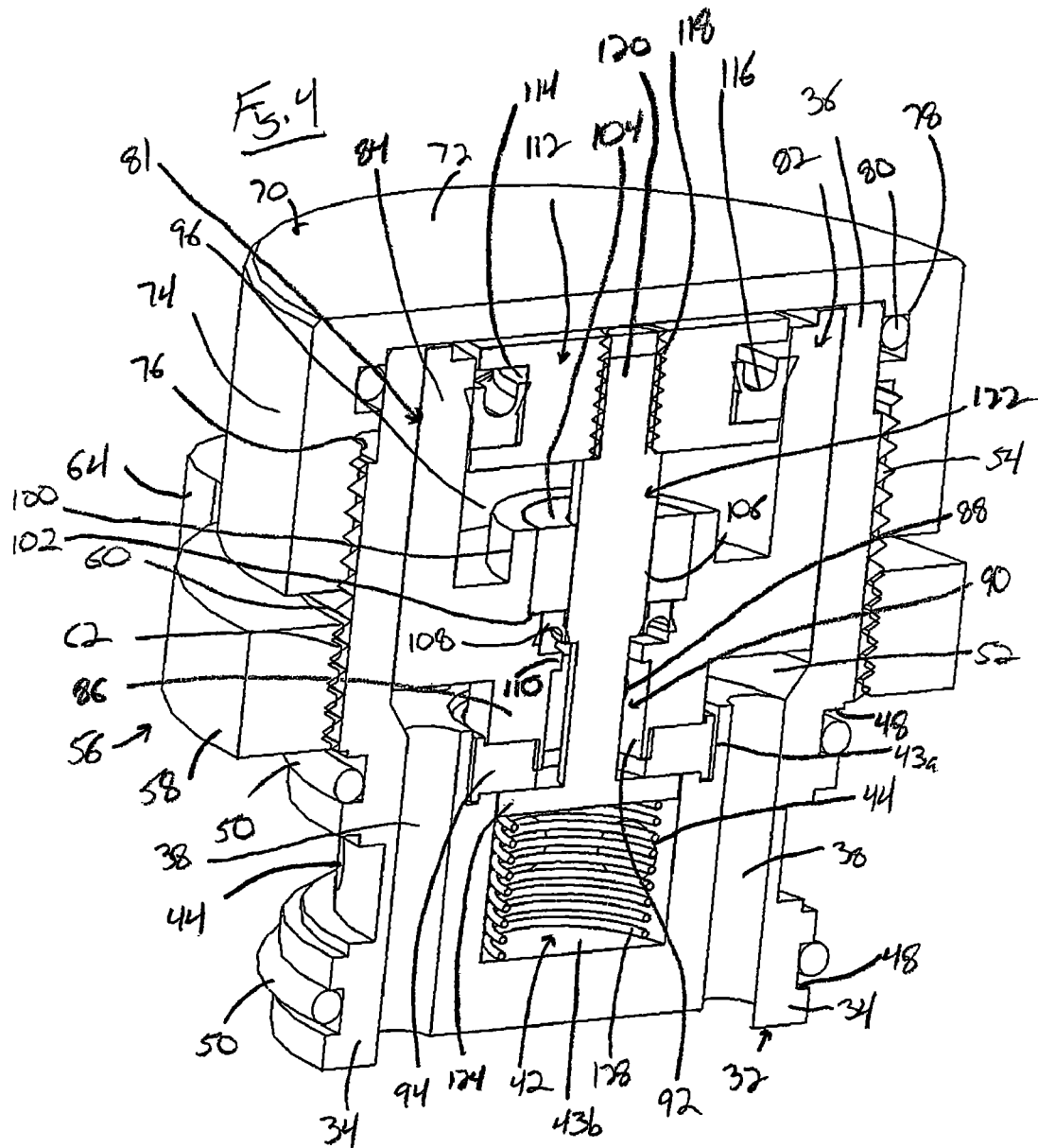

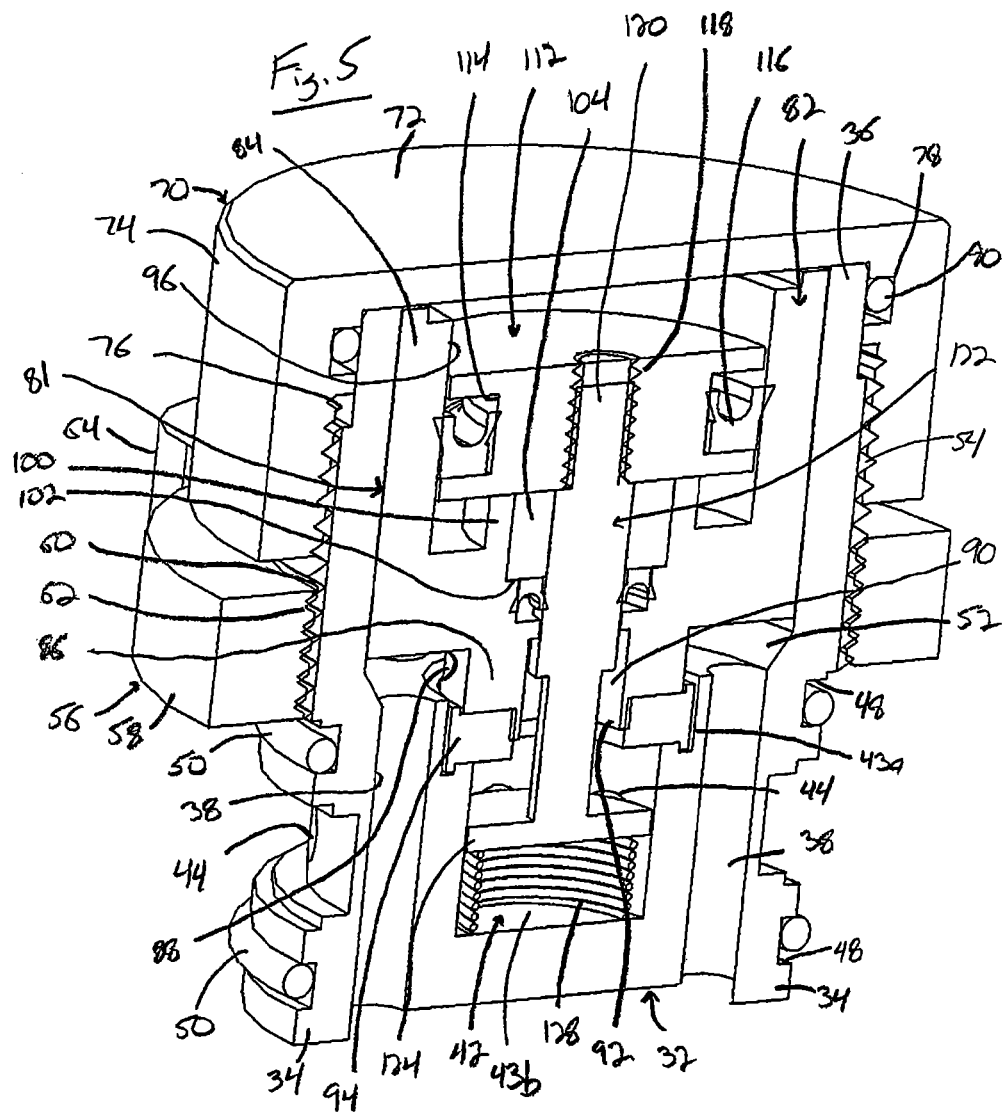

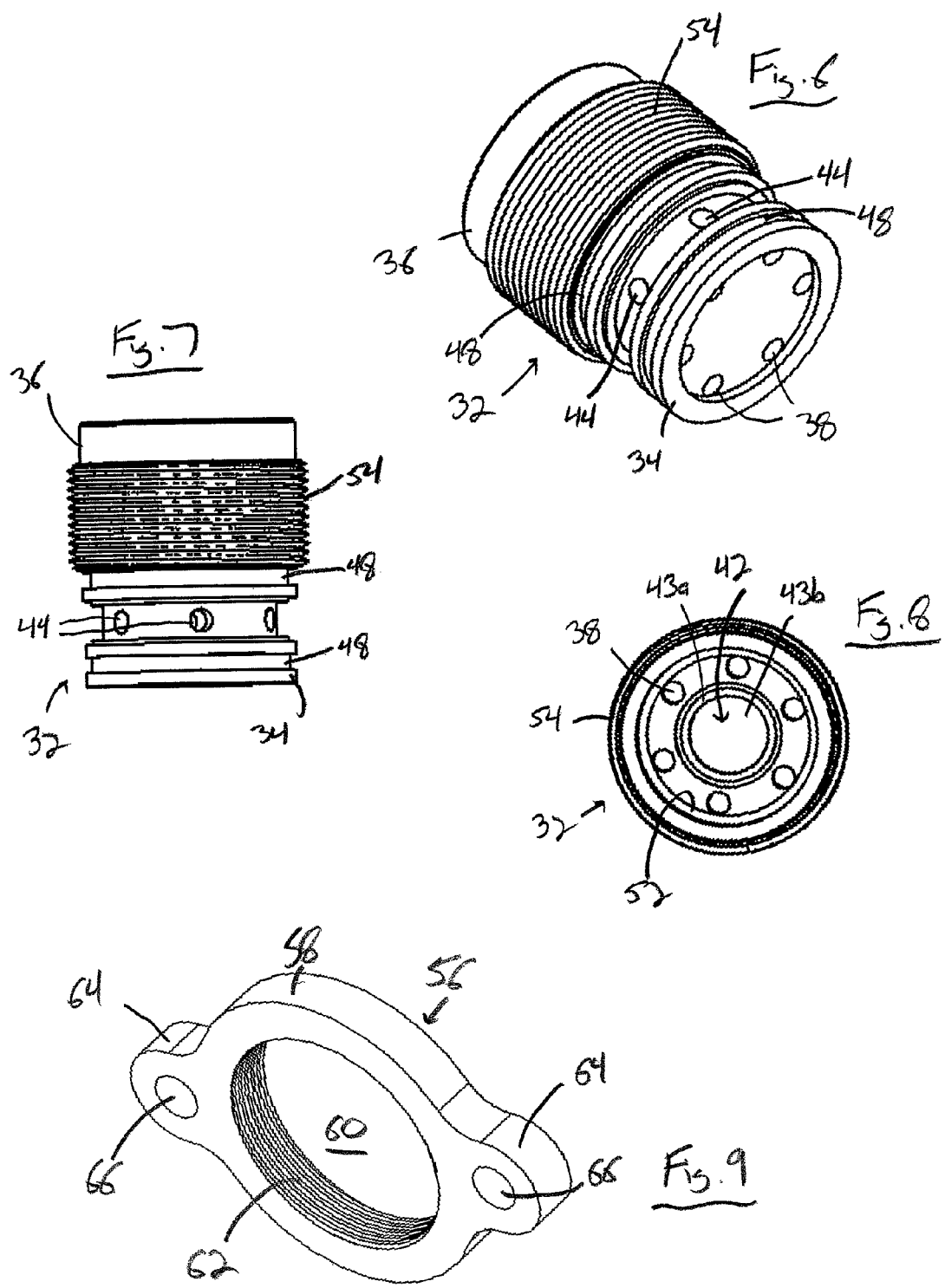

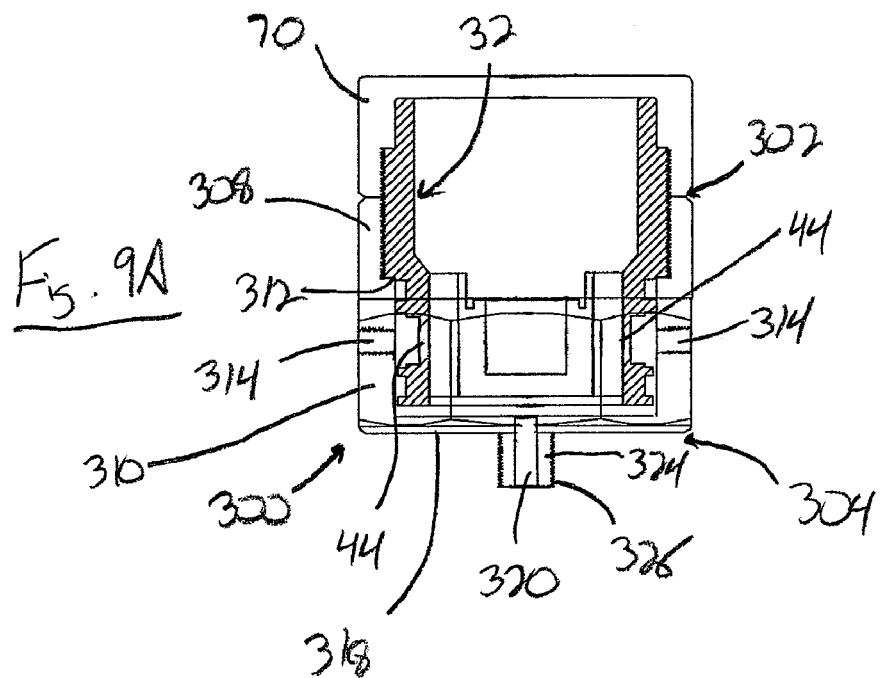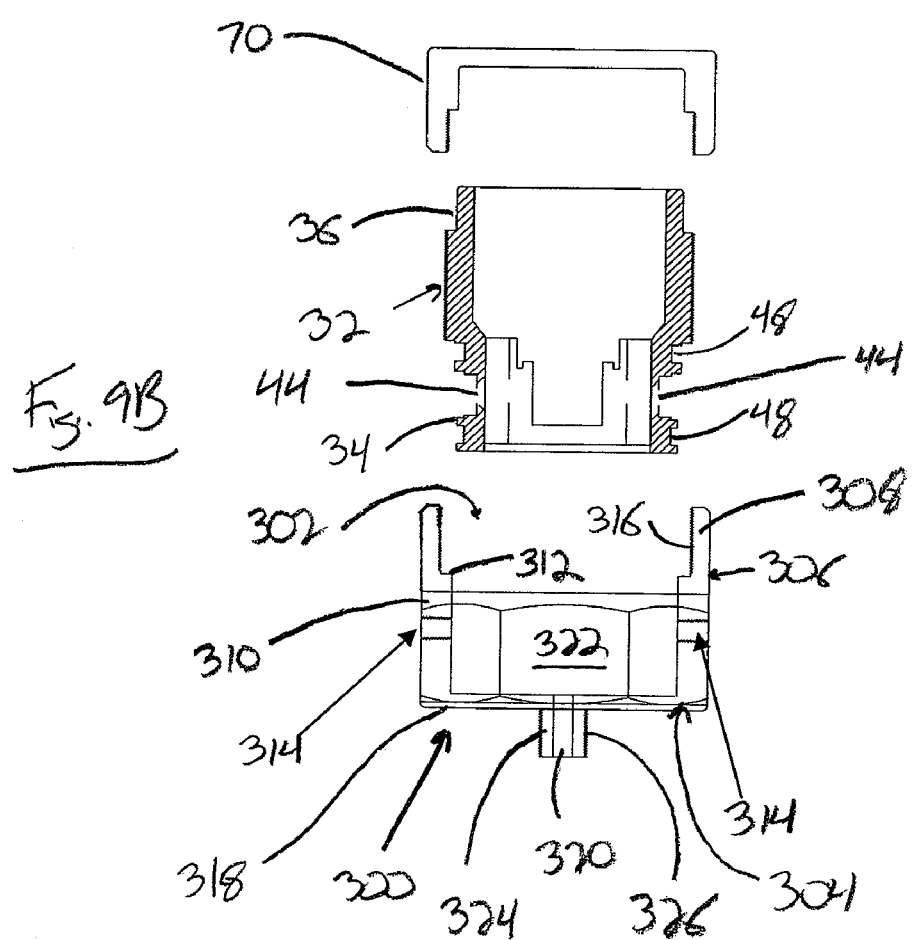

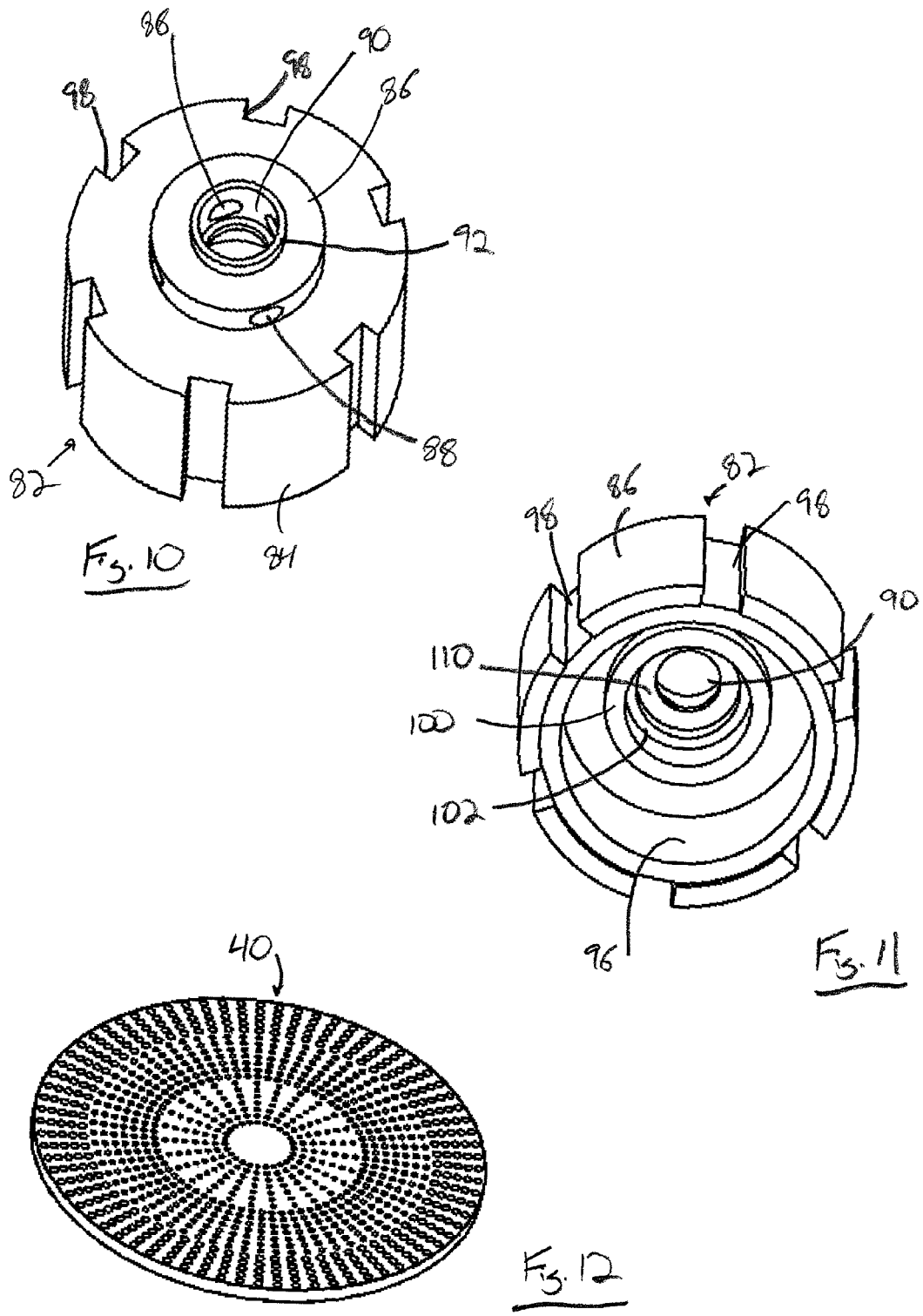

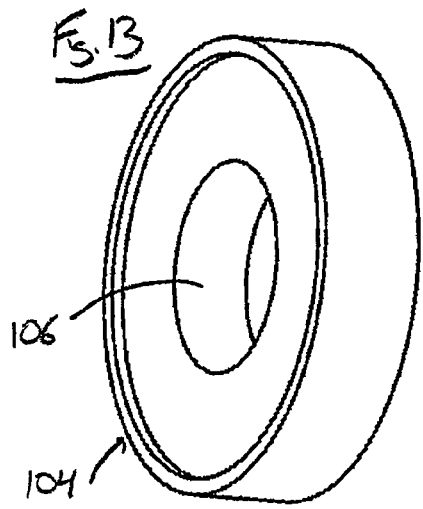
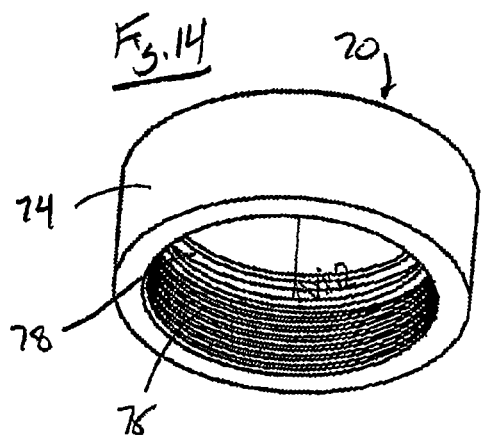
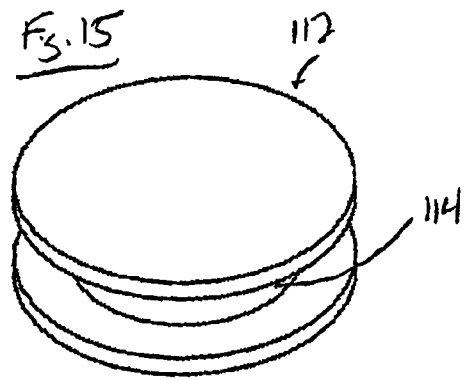
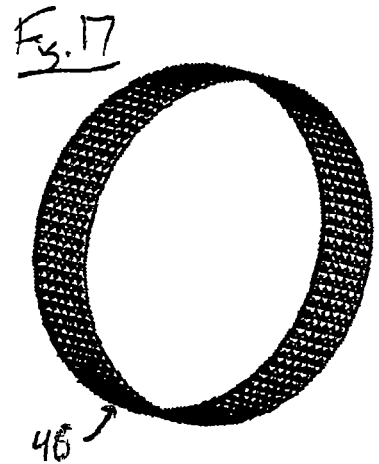
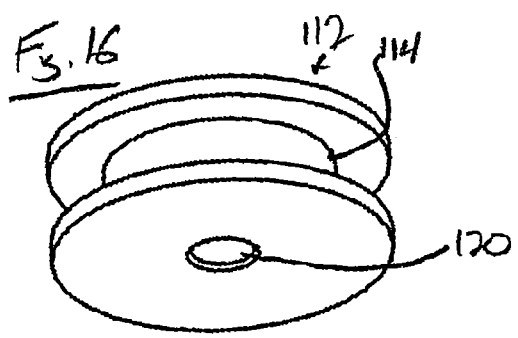

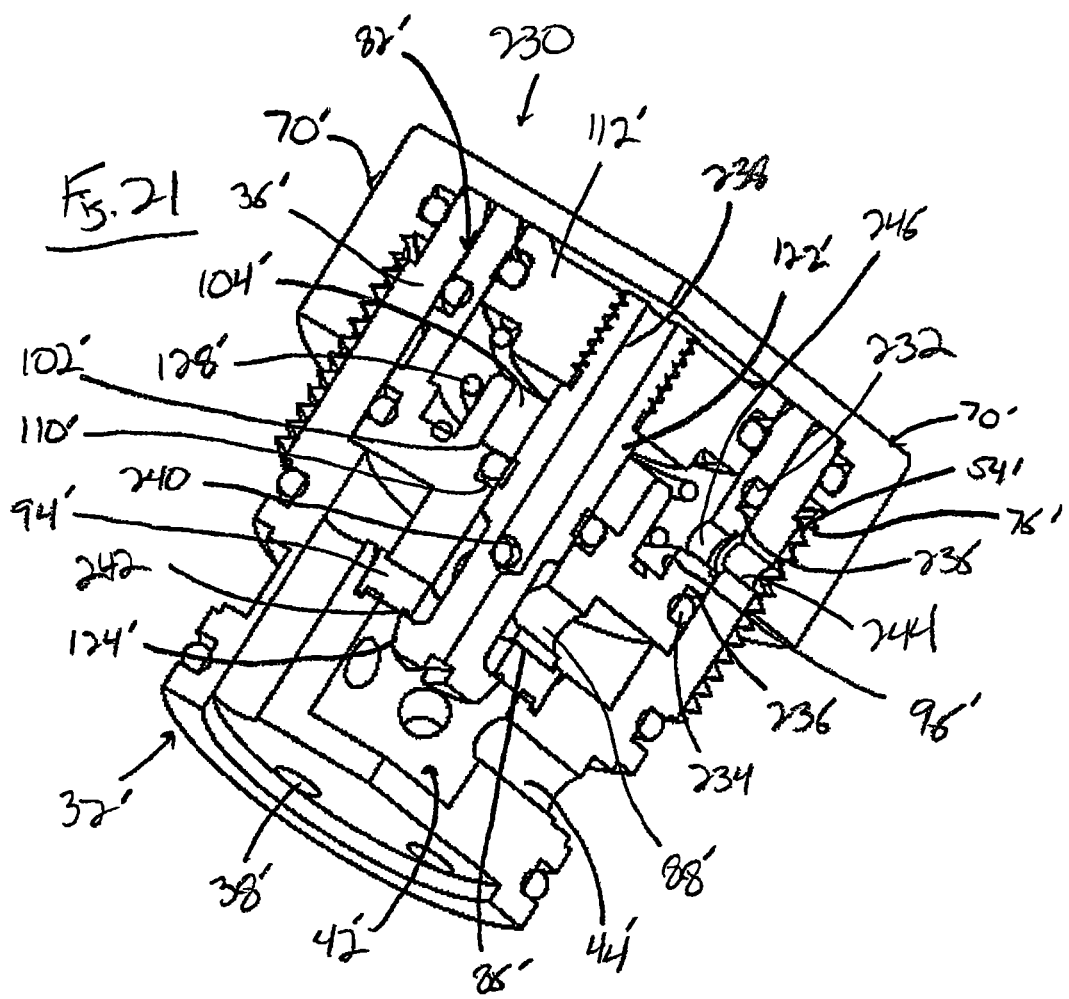

ND PRESSURE INFLATION WHEEL
CENTRAL TIRE INFLATION WHEEL ASSEMBLY AND VALVE

CROSS-REFERENCE TO RELATED APPLICATIONS

This application claims priority from U.S. Provisional Patent Application Ser. No. 60/778,040, filed on Mar. 1, 2006, and incorporated by reference herein in its entirety.

FIELD OF THE INVENTION

The present invention relates to tire inflation valves, and more specifically to a tire inflation valve that is releasably imbedded within a tire rim that forms part of a central tire inflation system of a vehicle.

BACKGROUND OF THE INVENTION

In order to inflate and deflate the tires forming part of the wheels on a vehicle, valves are located on the rims or hubs of the wheels to be used for selectively inflating and deflating the tires disposed around the wheel rims. Air can be directed through the valves either into or out of the tires to increase or decrease the air pressure in the tires, correspondingly altering the ride characteristics of the individual wheel, and the overall vehicle.

On most occasions the valves are only accessible from the exterior of the wheel, such that it is necessary to exit the vehicle to use the valve to inflate or deflate the tire. However, various central tire inflation systems have been developed that provide valves on the wheel rims that can be remotely activated from the cab or other driver compartment for the vehicle. These systems enable an individual to control the flow of air into and out of the vehicle tires using the valves to vary the ride characteristics of the tires as necessary. Examples of systems of this type are illustrated in each of Howald et al. U.S. Pat. No. 6,474,383, and Wang et al. U.S. Pat. No. 7,168,468, both of which are incorporated by reference herein. In each of theses patents, the rim of the wheel is formed with internal passages that enable air to be selectively passed from a compressed air supply through the passages to a valve. The valve is selectively operable from within the passenger compartment or cab of the vehicle to enable air to flow through the valve and into the tire through the passages formed in the rim. The passages are formed in either the outer rim (as in the '383 patent) or in the inner rim (as in the '468 patent) and form a flow path from an inlet for the compressed air through the rim and the associated valve to an opening on the exterior surface of the rim component that is located between the opposed sides of the wheel formed by the inner and outer rim sections. This outlet is also located between the beads of a tire mounted to the wheel, such that air exiting the outlet is retained within the tire to increase the air pressure, i.e., inflate the tire as desired.

Nevertheless, these prior art central tire inflation systems utilize passage designs that require the valves utilized therewith to have designs which require a number of additional components for the incorporation of the valves into tires for use with existing central tire inflation systems. These additional components greatly increase the cost and complexity of the valves, causing the valves to fail on a regular basis, necessitating that the valves be repaired and/or replaced on a consistent basis.

Additionally, the configuration of the passages in the rim in the prior art systems requires that the valve be positioned in an abutting relationship with the passages on the exterior surface of the rim component, i.e., surface-mounted on the rim. This positioning for the valve on the exterior of the rim in an exposed location where the valve can easily be damaged by debris or other objects striking the valve when the vehicle is in operation. In most instances, a wheel cover is required to protect the valve and other ancillary components for the central tire inflation system, such as hoses and fittings. The wheel cover is formed of steel or a composite material, and can trap rocks within the cover when in use, turning the cover into a rock tumbler that enables the rocks to damage the valve and other components of the CTIS system on the wheel that the cover is meant to protect.

As a result, it is desirable to develop a valve for use in a central tire inflation system that includes a minimum of parts and that can be incorporated into a number of different types of wheels. Also, it is desirable to develop a valve that can be positioned within a rim of a wheel incorporating a central tire inflation system that in a recessed or imbedded manner to effectively reduce the profile of the valve on the exterior of the wheel, thereby reducing the likelihood of the valve being struck and damaged during operation of the vehicle.

SUMMARY OF THE INVENTION

According to a first aspect of the present invention, a tire valve is provided that includes a simplified construction that can be seated directly within a tire wheel. The valve includes a main body that is positionable in a sealed configuration within an opening in the wheel rim in communication with the interior of the tire via passages formed within the rim. The body is also positioned within the opening in communication with a pressurized air source that is used to inflate or deflate the tire by passing air through the valve and along the passages to the tire. The main body encloses a valve mechanism that can be selectively operated in response to variations in the air pressure supplied to the valve, such that control of the operation of the valve can be remotely controlled via a controller connected to the pressurized air source. The positioning of the valve within the opening formed in the rim operates to reduce the profile of the valve that is positioned on the exterior of the wheel, to greatly reduce the chance of the valve being struck and damaged when the vehicle is in operation.

According to another aspect of the present invention, the valve is releasably mounted in the opening, such that the valve can be removed from the opening and replaced without having to remove the wheel, or a component of the wheel from the vehicle. An anchor ring is secured around the valve on the exterior side of the rim, and serves to both protect the valve within the opening and to maintain the valve in position with regard to each of the passages within the wheel and the pressurized air inlet. The valve is releasably secured to the anchor ring, such that the valve can be removed from the rim and the anchor ring without disengaging the anchor ring from the rim, or having to remove the rim from the vehicle.

According to another aspect of the present invention, the valve mechanism housed in the main body of the valve includes a minimum of moving parts to simplify the construction of the valve and to increase the longevity of the valve. These components are situated in a single, self-contained unit within the main body beneath a removable cap in a manner that also enables the valve mechanism to be easily removed, cleaned and/or replaced if necessary without having to remove the entire valve assembly from the wheel.

Numerous other aspects, features and advantages of the present invention will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 1 is an isometric view of a wheel assembly constructed according to the present invention;

FIG. 2 is a front plan view of the wheel assembly of FIG. 1;

FIG. 3 is a cross-sectional view of the wheel assembly along line 3-3 of FIG. 2;

FIG. 3A is a circular sectional view along line 3A-3A of FIG. 3 showing a first embodiment of a valve cartridge used in the wheel assembly of the present invention in the open position;

FIG. 3B is a circular sectional view along line 3B-3B of FIG. 3 showing the valve cartridge in a closed position:

FIG. 4 is a cross-sectional view of a second embodiment of the valve cartridge utilized in the wheel assembly of FIG. 1 in the closed position;

FIG. 5 is a cross-sectional view of the valve cartridge of FIG. 4 in the open position;

FIG. 6 is an isometric view of the main body of the valve cartridge of FIG. 4;

FIG. 7 is a side plan view of the main body of FIG. 6;

FIG. 8 is a top plan view of the main body of FIG. 6;

FIG. 9 is an isometric view of an anchor ring utilized with the valve cartridge of FIG. 4;

FIG. 9A is a cross-sectional view of a securing cup utilized with the valve cartridge of FIG. 4;

FIG. 9B is an exploded, cross-sectional view of the securing cup and valve cartridge of FIG. 9A;

FIG. 10 is a bottom isometric view of a valve seat used in the valve cartridge of FIG. 4;

FIG. 11 is a top isometric view of the valve seat of FIG. 10;

FIG. 12 is an isometric view of a disk screen used in the valve cartridge of FIG. 4;

FIG. 13 is an isometric view of a valve bushing of the valve cartridge of FIG. 4;

FIG. 14 is an isometric view of a cap used in the valve cartridge of FIG. 4;

FIG. 15 is a top isometric view of a piston used in the valve cartridge of FIG. 4;

FIG. 16 is a bottom isometric view of the piston of FIG. 15;

FIG. 17 is an isometric view of a ring screen used in the valve cartridge of FIG. 4;

FIG. 21 is a cross-sectional view of the first embodiment of the valve cartridge in the closed position as shown in FIG. 3B.

DETAILED DESCRIPTION OF THE INVENTION

Figure 18:
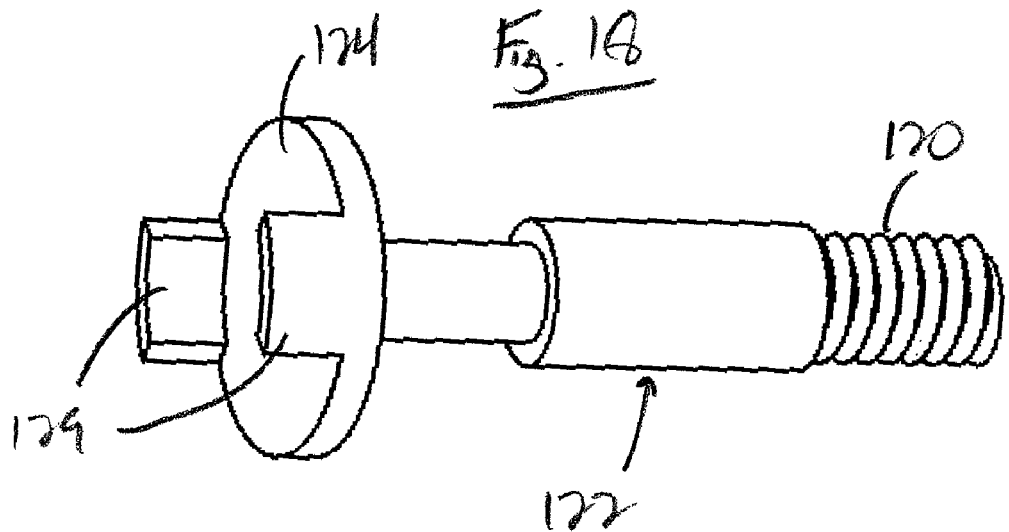
FIG. 18 is an isometric view of a first embodiment of a valve stem utilized with the valve cartridge of FIG. 4.

With reference now to the drawing figures in which like reference numerals designate like parts throughout the disclosure, a wheel assembly 1000 including an inner rim member 10 and an outer rim member 24 is illustrated in FIGS. 1-3B. The inner rim 10 includes a peripheral wall 12 adapted to support an inflatable tire 200 and an outer flange 14 at one end of the wall 12. Opposite the outer flange 14, the inner rim 10 includes a mounting wall 16 extending inwardly from the peripheral wall 12. The mounting wall 16 defines a central opening 17 that receives a hub (not shown) and includes a number of first openings 18 spaced around the circumference of the mounting wall 16 adjacent the peripheral wall 12, a number of second openings 19 spaced inwardly from the first openings 18 opposite the peripheral wall 12, and a valve mounting opening 20 disposed between adjacent second openings 19.

Each of the first openings 18 receives a wheel stud 22 therein that extends through the mounting wall 16 for connecting the outer rim 24 to the inner rim 10. The outer rim 24 and the outer flange 14 on the inner rim 12 define the outer edges of the wheel assembly 1000 within which opposed beads (not shown) of a tire (not shown) are mounted and retained. The second openings 19 are used to mount the wheel assembly 1000 on a number of hub bolts (not shown) that can secure the wheel assembly 1000 and tire to the hub (not shown) of a vehicle (not shown).

The inner rim 12 also includes an air passage or channel 26 formed in the inner rim 10 that extends from the valve opening 20 through the peripheral wall 12. The air channel 26 is formed in the inner rim 10 in any suitable manner, such as by drilling, and terminates in a groove 28 formed in the peripheral wall 12, and that preferably extends radially inwardly from the channel 26 towards the center of the wall 12. When the outer rim 24 is affixed to the inner rim 10, the outer rim 24 is positioned over the air channel 26 and a portion of the groove 28 to define an air flow path between the valve opening 20 and the exterior of the peripheral wall 12, over which the tire is positioned, thereby creating a path for introducing and removing air from the interior of the tire.

Alternatively, the shape and direction of the groove 28 can be varied as desired, so long as the end of the groove 28 opposite the channel 26 is not completely obscured by the outer rim 24. Additionally, the groove 28 can be omitted entirely, and the channel 26 can be formed to extend from the opening 20 to a point on the peripheral wall 12 below the outer rim 24 when the outer rim 24 is secured to the inner rim 10. Also, the outer rim 24 can be formed in a manner that allows communication between the channel 26 and the tire when the wheel assembly 10 is completed, such as by forming the groove 28 in the outer rim 24. Further, the inner rim 10 and the outer rim 24 can be formed as a single piece rim (not shown), eliminating the need for securing the sections to one another.

Within the valve opening 20 is mounted a control valve cartridge 30 that is used to control the flow of air into and out of the tire 200. By mounting the valve cartridge 30 within the opening 20 extending through the inner rim 10, and located radially inwardly of the outer rim 24, the valve 30 is protected from being damaged by objects stuck by and striking the inner rim 10 or outer rim 24. This is because when the valve 30 is disposed within the opening 20, a much smaller portion of the valve 30 is disposed on the exterior surface of the wheel assembly 1000. Also, the positioning of the valve opening 20 adjacent to the first openings 18 and second openings 19 positions the wheel studs 22 and the hub mounting bolts close to the portion of the valve 30 outside of the opening 20. The studs 22 and bolts are longer than the valve 30, such that they prevent objects and debris from being able to move far enough into the wheel assembly 1000 to contact the valve 30.

Figure 19:
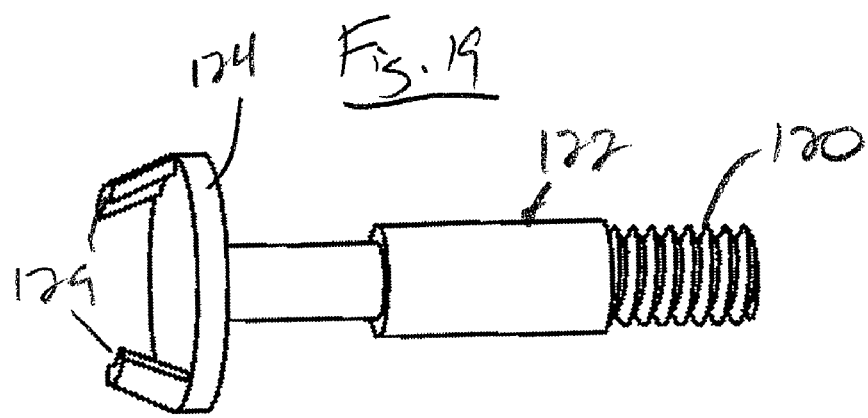
FIG. 19 is an isometric view of a second embodiment of a valve stem utilized with the valve cartridge of FIG. 4.
Figure 20:
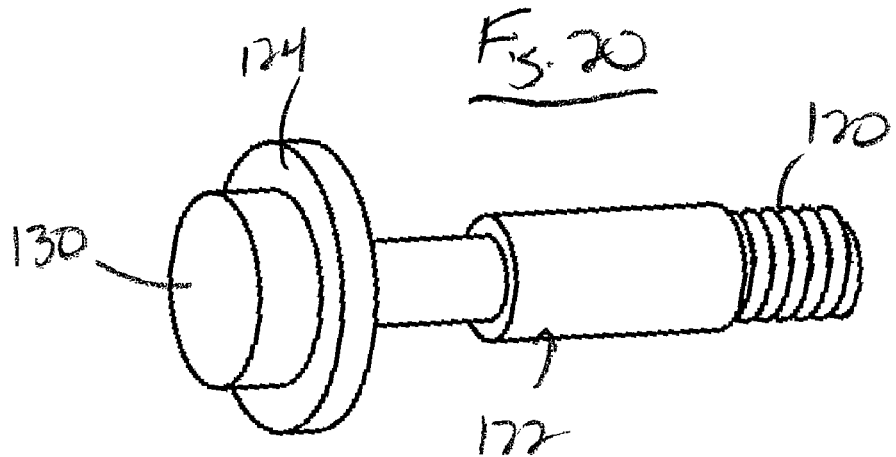
FIG. 20 is an isometric view of a third embodiment of the valve stem utilized with the valve cartridge of FIG. 4.

Referring now to FIGS. 4-20, in one embodiment, the valve cartridge 30 includes a main body 32 that is positioned within and frictionally or sealingly engaged with the valve opening 20. The main body 32, as best shown in FIGS. 4-8, includes a lower end 34 and an upper end 36 connected to one another. The lower end 34 is preferably cylindrical in shape, and includes a number of air inlet shafts 38 extend through the lower end 34 that are aligned with one or more mating holes (not shown) in the wheel hub (not shown) to provide a connection to the pressurized air supply (not shown) used to inflate or deflate the tire 200. The lower ends of the inlet shafts 38 are covered by disk screen 40 (FIG. 12) engaged within the lower end of the main body 32. Between the shafts 38 is disposed a central chamber 42. The central chamber 42 has a wide upper portion 43a, and a narrow lower portion 43a from which extend a number of air outlet shafts 44 which are positioned between and oriented perpendicular to the inlet shafts 38. The outlet shafts 44 are surrounded on their outer ends on the exterior of the main body 32 by a cylindrical ring screen 46 (FIG. 17) formed similarly to the disk screen 40. Above and below the screen 46 on the exterior of the main body 32 are disposed channels 48 in which are located sealing members 50 to enable the main body 32 to frictionally and sealingly engage the circumference of the valve opening 20, securely holding the valve 30 therein.

The upper end 36 defines a central recess 52 that extends the entire length of the upper end 36. Opposite the recess 52, the exterior of the upper end 36 includes a screw thread 54. To assist the sealing members 48 and 50 in securely holding the valve 30 within the valve opening 20, an anchor plate or ring 56, best shown in FIGS. 4, 5, and 9, is threadedly engaged with the thread 54 on the upper end 36. The anchor plate 56 includes a circular central part 58 that defines a central opening 60 having a threaded interior surface 62 matable with the thread 54. Extending from the central part 58, and preferably from approximately opposite side of the central part 58, are a pair of securing flanges 64 each having an aperture 66 defined therein. The apertures 66 can receive bolts (not shown) therein that secure the flanges 64 to the inner rim 10, and the valve 30 within the opening 20.

As an alternative to the anchor ring 56, especially for use in situations where the rim 10 is not sufficiently thick to enclose the valve cartridge 30, a valve cup 300 is illustrated in FIGS. 9A and 9B. The cup 300 is formed with an open upper end 302 and a closed lower end 304 between which extends a circular wall 306. The circular wall 306 includes a lower section 310 and an upper section 308 separated by an annular shoulder 312. The lower section 310 includes a number of apertures 314 formed therein that extend through the lower section 310 generally perpendicular to the wall 306. The upper section 308 includes a threaded interior surface 316 that extends the length of the upper section 308. A bottom wall 318 forming the closed lower end 304 includes an air inlet 320 that is in fluid communication with the interior 322 of the cup 300. The air inlet 320 is positioned within a sleeve 324 that extends outwardly from the bottom wall 318 and includes a threaded exterior surface 326 extending the length of the sleeve 324.

The main body 32 of the valve cartridge 30 can be positioned within the cup 300 by inserting the lower end 34 into the lower section 310, and threadedly engaging the upper section 36 with the interior surface 316 of the upper section 308. The interior surface 316 allows the upper end 36 to be inserted into the cup 300 until the upper end 36 contacts the annular shoulder 312. In this position, the upper end 36 of the main body 32 extends outwardly from the upper end 302 of the cup 300, while the lower end 34 is spaced a short distance above the lower end 304. Additionally, when the main body 32 is fully inserted within the cup 300, the air outlet shafts 44 in the lower end 34 are generally aligned with the apertures 314 in the lower section 310, and are sealed off from the upper end 302 and lower end 304 of the cup 300 by the sealing members 50 located within the channels 48 extending around the lower end 34. Also, because the upper end 36 is positioned above the upper end 302 of the cup 300, the cap 70 can be engaged with the main body 32 as discussed previously, to retain the various components of the valve cartridge 30 within the main body 32.

Either prior to or after insertion of the main body 32 within the cup 300, the cup 300 can be secured to a wheel rim 10 such that the apertures 314 are positioned in alignment with the passage 26 to enable air passing through the valve cartridge 30 and out the outlet shafts 44 to enter the passage 26. Also, the sleeve 324 within which the air inlet 320 is disposed is engageable with a threaded hub air outlet (not shown) to both securely engage the air inlet 320 for the cup 300 with the air outlet on the hub, and to provide added support to the cup and valve cartridge 30.

To hold the valve components of an interior valve mechanism 81 within the central recess 52, a cap 70 is engageable with the thread 54 above the anchor plate 56. As best shown in FIGS. 4, 5 and 14, the valve cap 70 is generally cylindrical in shape, having a top wall 72 from which downwardly extends a circular side wall 74. The side wall 74 includes a threaded interior surface 76 that is engageable with the thread 54 on the upper end 36. Immediately adjacent the top wall 72, the side wall 74 includes a peripheral notch 78 that is co-linear with the threaded interior surface 76 and that encloses a sealing member 80 therein. Thus, when the cap 70 is engaged with the upper end 36 of the main body 32, the sealing member 80 sealingly engages the upper end 36 above the thread 54 to provide and airtight sea between the upper end 36 and the cap 70. Being threadedly engaged with the upper end 36, the cap 70 is also removable from the main body 32 in order to clean or replace the interior components of the valve 30 without also removing the main body 32 from the valve opening 20. This is due to the ability of the main body 32 to be secured within the valve opening 20 by either or both of the sealing members 48 and 50 and the anchor plate 56, which are each located below the cap 70.

Turning now to FIGS. 4, 5, 10 and 11, the interior valve mechanism 81 includes a valve seat 82 is disposed within the central recess 52 of the upper end 36 of the main body 32. The valve seat 82 includes a wide upper end 84 and a narrow lower end 86. The narrow lower end 86 includes a number of air flow tubes 88 formed therein that extend from the exterior of the lower end 86 into fluid communication with a central opening 90 located in the center of the lower end 86. The lower end 86 also includes an axially extending ring 92 at the lowermost end. The ring 92 provides an alignment and engagement point for the lower end 86 of the valve seat 82 to rest on and sealingly engage a sealing ring 94 located within the wide upper end 43a of the chamber 42 in the main body 32. This engagement provides an airtight seal between the lower end 86 of the valve seat 82 and the main body 32.

The wide upper end 84 of the valve seat 82 defines an inner chamber 96 that is disposed concentrically with the central opening 90 in the lower end 86. As best shown in FIGS. 10 and 11, on the exterior of the upper end 84 opposite the chamber 96 are formed a number of spaced air flow passages 98 that extend the entire length of the upper end 84 to allow air entering through the shafts 38 in the main body 32 to flow upwardly around the valve seat 82. Immediately below the upper end 84 of the valve seat 82, the passages 98 extend inwardly into fluid communication with the inner chamber 96 of the valve seat 82.

Inside the upper end 84 of the valve seat 82 adjacent the opening 90, the chamber 96 defines a circular retaining wall 100 having an annular shoulder 102 defined therein. The retaining wall 100 and shoulder 102 are used to receive and engage a valve bushing 104. As best shown in FIGS. 4, 5 and 13, the valve bushing 104 is generally cylindrical in shape and defines a central aperture 106 that, when bushing 104 is disposed on the shoulder 102 within the retaining wall 100, is positioned concentrically with the chamber 96 and the opening 90 in the valve seat 82 as well as with the central chamber 42 in the lower end 34 of the main body 32. A sealing member 108 is positioned between the bushing 104 and a peripheral flange 110 separating the opening 90 from the chamber 96 to provide an airtight seal between the bushing 104 and the upper end 86 of the valve seat 82.

Referring now to FIGS. 4, 5, 15 and 16, a valve piston 112 is disposed within the chamber 96 above the bushing 104. The piston 112 is generally cylindrical in shape with a diameter slightly less than that of the interior of the chamber 96, and including a peripheral recess 114 within which is disposed a sealing member 116. The piston 112 is slidably movable within the chamber 96 and the sealing member 116 engages the chamber 96 in manner that provides an airtight seal between the piston 112 and the chamber 96 as the piston 112 moves within the chamber 96.

The piston 112 also includes a threaded bore 118 extending through the center of the piston 112 in a direction perpendicular to the recess 114. The bore 118 is threadedly engaged with a threaded end 120 of a valve stem 122, best shown in FIGS. 4, 5 and 18-20. The valve stem 122 extends from the threaded end 120 downwardly through the aperture 106 in the bushing 104. Downwardly from the threaded end 120, the stem 122 has a diameter slightly less than that of the aperture 106 in the bushing 104, such that the busing 104 provides a guide for the movement of the valve stem 122 when moved as a result of the movement of the piston 112. Below the bushing 104, the stem 122 extends through the opening 90 and into the chamber 42, where the stem 122 terminates with a radial stem flange 124 positioned below and in sealing engagement with the sealing flange 94 opposite the valve seat 82. The stem flange 124 includes a number of tines 126 that extend outwardly from the flange 124 and are crimped or bent inwardly to grip one end of a spring 128. The spring 128 is positioned between the stem flange 124 and the lowermost end of the central chamber 42, such that the spring 128 urges the valve stem 122 and the piston 112 upwardly, to sealingly engage the flange 124 with the sealing flange 94, and to position the piston 112 adjacent the upper end 84 of the valve seat 82. The stem flange 124 can also include various spring-engaging features in different embodiments (FIGS. 18-20) that enhance the ability of the flange 124 to stay in engagement with the spring 128, such as outwardly extending or angled tabs 129, a securing ring 130 extending downwardly from the flange 124 and having a diameter larger or smaller than that of the spring 128 for the spring 128 to seat therein or therearound, respectively, or a 130 ring including a slot (not shown) that receives and engages a part of the spring 128 to positively hold the flange 124 on the spring 128.

Looking now at FIG. 4, when the valve 30 is not in operation no air flow is passing through the valve 30, such that the bias of the spring 128 urges the flange 124 against the sealing flange 94 to prevent any air flow from the inlet shafts 38 in the lower end 34 of the main body 32, through the air tubes 88 in the lower end 86 of the valve seat 82 and past the sealing flange 94 into the air outlet shafts 44 in the lower end 43 of the main body 32 to the tire 200. However, upon activation of the central tire inflation system to which the valve 30 is connected, a pressurized air flow is directed from the hub through the air inlet shafts 38 and along the air flow passages 98 in the valve seat 82 into the upper end 36 of the main body 32 above the piston 112. The pressure of the air flow builds in the upper end 36 until the pressure overcomes the bias of the spring 128 and the air pressure in the tire 200 acting through the valve 30. Normally, this pressure is selected to be approximately one-third of the pressure in the tire 200, but the valve 30 can be set to operate at alternative pressures depending upon the particular use to which the valve 30 is put. Once the pressure in the upper end 36 reaches this point, the pressure presses downwardly on the piston 112, causing the piston 112 and valve stem 122 to move downwardly with respect to the bushing 104, valve seat 82 and main body 32. Sufficient movement of the piston 112 due to the air pressure in the upper end 36 above the piston 112 disengages the stem flange 124 from the sealing flange 94, allowing air to flow around the stem flange 124 and into the tire 200 through the air outlet shafts 44, as shown in FIG. 5. Once the desired air pressure for the tire 200 has been reached and sensed by the central tire inflation system, the air flow to the valve 30 through the air inlet shafts 38 is stopped, allowing the spring 128 to re-engage the stem flange 124 with the sealing flange 94 and maintain the desired pressure in the tire 200. The valve 30 may also include a suitable venting member (not shown) to enable the valve 30 to eliminate any backpressure in the valve 30 that occurs during the operation of the valve 30.

Referring now to FIGS. 3A, 3B and 21, another embodiment of the valve 230 is illustrated. The valve 230 is formed similarly to the valve 30 illustrated and discussed previously, with the same general configuration as the previous embodiment, including the main body 32' the valve seat 82' and the cap 70'.

However, the valve seat 82' is modified to eliminate the air flow passages 98 and to include a pair of sealing members 232 and 234 disposed on the exterior of the valve seat 82' within grooves 236. The sealing members 232 and 234 are preferably low friction seals and extend around the valve seat 82' in the grooves 236 generally perpendicular to the longitudinal axis of the valve seat 82' and function to provide an air-tight seal between the valve seat 82' and the upper end 36' of the main body 32'. Thus, no air flow occurs between the main body 32' and the valve seat 82' as in the previous embodiment.

To provide the air flow to the top of the valve body 82' that acts on the piston 112', the valve stem 122' is formed with an internal passage 238 that extends from the end of the stem 122' located within the piston 112' along the center of the stem 122' to a point spaced from the stem flange 124' an generally in at least partial alignment with the air flow tubes 88' in the lower end of the valve seat 82'. At this point, the passage 238 communicates with a bore 240 extending into the stem 122' generally perpendicular to the passage 238, which allows air flow from the tubes 88' to pass through the bore 240 and into the passage 238. The air then flows up through the passage 238 to the upper end of the stem 122' into the space between the piston 112' and the cap 70' to provide the motive force on the piston 112'.

This air flow through the stem 122' operates to move the piston 112' against the bias of a spring 128', as in the previous embodiment. However, the spring 128 has been moved from the central chamber 42' in the lower end 34' of the main body 32'. In this embodiment, the spring 128' is disposed within the chamber 96' of the valve seat 82' between the lower end of the piston 112' and the lower end 86' of the valve seat 82'. The spring 128' is positioned around the bushing 104' and urges the piston 112' towards the cap 70'. In this location, the spring 128' is positioned within the valve 230 such that the spring 128' can be removed with the other moving parts of the valve 230 disposed within the main body 32' when the components are to be replaced. The removal of the spring 128' from the lower end 34' of the main body 32' also allows for a greater amount of air flow through the lower end 34', because the spring 128' is no longer present to obstruct this air flow.

In this embodiment, the stem flange 124' on the valve stem 122' is also modified to include an upwardly extending peripheral tab 242, as opposed to the simple circular flange 124' in the previous embodiment. This tab 242 is pulled into positive sealing engagement with the lower side of the seal 94' by the spring 128', and provides a secure air-tight seal until actuation of the valve 230.

Additionally, to address the problem of backpressure within the valve 30', the upper end 36' of the main body 32' includes a bore 244 that is extends through the screw thread 54' on the upper end 36', but that is covered by the cap 70' when the cap 70' is engaged with the thread 54'. This bore 244 communicates with an aperture 246 formed in the upper end 86' of the valve seat 82' that communicates with the central chamber 96' in the valve seat 82' and functions as a vent to reduce any back pressure present within the valve 230 during operation, by allowing the pressurized air to escape the valve 230 through the clearance between the threads 54' on the main body 32' and 76' on the cap 70'.

In addition to the description of the previous embodiments, the wheel assembly 1000 and valve 30 of the present invention can also be modified in various manners to provide added functionality to the assembly 1000 and valve 30. For example, the upper end 36 of the main body 32 and the upper end 86 of the valve seat 82 can be chamfered to enable the components of the valve 30 to be assembled and disassembled more easily. Also, the various structural components of the valve 30 can be formed from any suitable fluid-impervious material, such as a metal or hard plastic, to reduce the overall weight of the valve 30.

Various alternatives are contemplated as being within the scope of the following claims, particularly pointing out and distinctly claiming the subject matter regarded as the invention.

We hereby claim:

1. A wheel assembly to be utilized on a vehicle including a central tire inflation system, the assembly comprising:
   a) a rim securable to a hub for a vehicle, the rim including an aperture therein extending completely through the rim, and at least one air passageway extending from the aperture through the rim to an exterior surface of the rim; and
   b) a valve cartridge releasably secured within the aperture to extend completely through the aperture, the cartridge including:
      i) a main body having a lower end positioned in sealing engagement within the aperture to align an air outlet shaft in the lower end with the at least one air passageway and an air inlet shaft in the lower end with a pressurized air inlet disposed on a hub of the vehicle, and an upper end extending outwardly from the aperture;
      ii) a valve mechanism disposed within the main body and comprising:
         a.) valve seat slidably engaged within the upper end of the main body so as to be slidably removable from the main body, the valve seat having at least one exterior passageway disposed adjacent the upper end of the main body and in communication with the air inlet shaft and a number of air flow tubes adjacent and in selective communication with the air outlet shaft the air outlet shaft; and
         b.) a valve stem slidably and sealingly engaged within the valve seat and configured to selectively connect the air flow tubes in the valve seat with the air outlet shaft in the lower end of the main body; and
      iii.) a cap releasably engageable with the main body over the valve mechanism wherein the cap directs airflow from the air inlet shaft through the exterior passageway against the valve stem.

2. The wheel assembly of claim 1 wherein the cap is releasably secured to threads disposed on an exterior surface of the main body.

3. The wheel assembly of claim 1 further comprising an anchor ring securable to the rim and defining an opening therein positioned in alignment with the aperture, the main body releasably engaged within the opening when positioned within the aperture in the rim.

4. The wheel assembly of claim 3 wherein the anchor ring is releasably secured to threads disposed on an exterior surface of the main body.

5. The wheel assembly of claim 3 wherein the anchor ring includes a pair of securing flanges extending outwardly from the anchor ring and spaced from one another, the pair of flanges fixedly secured to the rim around the aperture.

6. The wheel assembly of claim 1 wherein the valve stem is biased to close the valve mechanism by a spring disposed within the lower end of the main body and engaged between the main body and the valve stem.

7. The wheel assembly of claim 6 wherein the valve seat includes a sealing engagement flange.

8. The wheel assembly of claim 1 wherein the valve mechanism is removable as a single unit from within the main body.

9. The wheel assembly of claim 1 further comprising a valve cup that is positioned within the aperture and includes at least one air inlet aperture aligned with the air inlet shaft in the lower end of the main body, and at least one air outlet aperture aligned with the at least one air passageway in the rim, wherein the cup receives and holds the valve cartridge within the aperture.

10. The wheel assembly of claim 1 wherein the aperture is disposed on the rim radially inwardly from a number of bolt openings extending through the rim.

11. A valve cartridge adapted to be utilized with a rim incorporating at least one internal passage within the rim forming part of a central tire inflation system for a vehicle and an aperture extending through the rim and intersecting the at least one internal passage, the valve cartridge comprising:
   a) a main body including an upper portion and a lower portion, the lower portion including a number of air inlet shafts directly engageable with a pressurized air supply on the vehicle, a number of air outlet shafts directly engageable with the at least one internal passage in the rim, and at least one peripheral sealing member engageable within the aperture with the rim;
   b) a valve mechanism disposed within the upper portion and extending into the lower portion to selectively open and close communication between the air inlet shaft and the air outlet shaft, the valve mechanism comprising:
      i.) a valve seat slidably engaged within the upper end of the main body so as to be slidably removable from the main body, the valve seat having at least one exterior passageway disposed adjacent the upper end of the main body and in communication with the air inlet shaft and a number of air flow tubes adjacent and in selective communication with the air outlet shaft the air outlet shaft; and
      ii.) a valve stem slidably and sealingly engaged within the valve seat and configured to selectively connect the air flow tubes in the valve seat with the air outlet shaft in the lower end of the main body; and
   c) a cap releasably engageable with the main body over the valve mechanism, wherein the cap directs airflow from the air inlet shafts through the at least one exterior passageway against the valve stem.

12. The valve cartridge of claim 11 wherein the valve seat is sealingly engaged within the upper portion of the exterior housing.

13. The valve cartridge of claim 11 further comprising an anchor ring a releasably engaged with the main body and adapted to be fixedly secured to the rim around the aperture.

14. A method for altering the internal pressure of a tire of a vehicle using a central tire inflation system on the vehicle, the method comprising the steps of:
   a) providing a vehicle including central tire inflation system having a pressurized air reservoir connected to a dispensing outlet located on a hub of the vehicle and a control mechanism operably connected to the reservoir to dispense pressurized air through the dispensing outlet;
   b) providing a wheel rim including a valve aperture extending through the rim and at least one internal air passageway located within the rim and extending between the aperture and an exterior surface of the rim;
   c) providing a valve cartridge including a main body having an upper portion and a lower portion, the lower portion including at least one air inlet shaft directly engageable with the dispensing outlet, at least one air outlet shaft directly engageable with the at least one internal air passageway, and at least one peripheral sealing member engageable with the rim within the aperture, a valve mechanism disposed in the upper portion and extending into the lower portion to selectively enable fluid communication between the at least one air inlet shaft and the at least one air outlet shaft, and a cap secured to the main body over the valve mechanism to hold the valve cartridge in the main body and to direct air flow through the valve cartridge from the at least one air inlet shaft to the at least one air outlet shaft;
   d) inserting the valve cartridge within the aperture in the rim to align the at least one air outlet shaft with the at least one internal air passage;
   e) securing the rim to the hub to align and engage the at least one air inlet shaft with the dispensing outlet on the hub; and
   f) operating the control mechanism to dispense air from the reservoir into the valve cartridge to operate the valve and alter the internal pressure of the tire secured to the rim.

15. The method of claim 14 wherein the step of inserting the valve cartridge within the aperture comprises:
   a) securing an anchor ring to the rim around the aperture; and
   b) engaging the valve cartridge with the anchor ring.

16. The method of claim 14 further comprising the step of removing the valve mechanism as a single piece from the main body after inserting the valve cartridge within the aperture.

17. The method of claim 16 further comprising the step of disengaging the cap from the main body prior to removing the valve mechanism.

* * * * *